United States Patent [19]

Miller

[11] Patent Number: 5,156,751

[45] Date of Patent: Oct. 20, 1992

[54] THREE STAGE CENTRIFUGE AND METHOD FOR SEPARATING WATER AND SOLIDS FROM PETROLEUM PRODUCTS

[76] Inventor: Neal J. Miller, 920 Lakeview La., Casper, Wyo. 82604

[21] Appl. No.: 691,642

[22] Filed: Mar. 29, 1991

[51] Int. Cl.$^5$ .................. B01D 21/26; B04B 1/20; B04B 3/04
[52] U.S. Cl. .................. 210/787; 210/97; 210/178; 210/360.1; 210/369; 210/378; 210/739; 210/774; 210/781; 494/52; 494/53
[58] Field of Search .................. 210/378, 380.3, 381, 210/512.1, 708, 781, 787, 369, 360.1, 178, 774, 97, 696, 739; 494/52, 53, 54, 55, 56

[56] References Cited

U.S. PATENT DOCUMENTS

| 3,795,361 | 3/1974 | Lee | 494/53 |
|---|---|---|---|
| 4,037,781 | 7/1977 | High | 494/60 |
| 4,240,578 | 12/1980 | Jackson | 494/53 |
| 4,245,777 | 1/1981 | Lavanchy | 494/53 |
| 4,362,620 | 12/1982 | High | 210/378 |
| 4,411,646 | 10/1983 | Cyphelly | 494/53 |
| 4,432,747 | 2/1984 | Posse et al. | 494/53 |
| 4,575,370 | 3/1986 | LaMontagne | 494/53 |
| 4,668,213 | 5/1987 | Krämer | 494/53 |
| 4,729,830 | 3/1988 | Suzuki | 210/380.3 |
| 4,731,182 | 3/1988 | High | 494/54 |
| 4,814,092 | 5/1989 | Patzelt | 210/708 |
| 4,957,475 | 9/1980 | Kreill | 494/53 |
| 4,983,289 | 1/1991 | Salomon | 210/380.1 |

Primary Examiner—Robert A. Dawson
Assistant Examiner—Sun Uk Kim
Attorney, Agent, or Firm—Duane Burton

[57] ABSTRACT

A three stage centrifuge especially adapted to the separation of oil, water, and solid particles in an emulsion. As an example, the centrifuge may be used to separate sediment and water from a petroleum product such as crude oil. The three stage centrifuge includes a rotatable bowl that spins the emulsion to separate the fluid oil and water into separate pools within the bowl. The solid particles are also moved radially outward within the rotatable bowl by centrifugal force. A conveyor auger contacts the solid particles and discharges the solids from the rotatable bowl through a solids discharge port. Oil discharge tubes contact the oil pool confined between oil baffle plates on the conveyor auger and allow the oil to be discharged from the rotatable bowl. Water weirs contact the water pool and allow the water to be discharged from the rotatable bowl.

19 Claims, 5 Drawing Sheets

THREE STAGE CENTRIFUGE AND METHOD FOR SEPARATING WATER AND SOLIDS FROM PETROLEUM PRODUCTS

FIELD OF THE INVENTION

This invention relates to centrifuge apparatus and more particularly to a novel three stage centrifuge especially adapted to a method for separating water and solid particles from petroleum products.

BACKGROUND OF THE INVENTION

In the production and use of petroleum products such as crude oil, some oil may become contaminated with solid and liquid contaminants such as sediments and water. In general, excessive levels of any contaminants in a petroleum product yield a final product that is non-usable. Moreover, the contaminated petroleum product may be difficult to dispose of in an environmentally safe manner.

Sediment and water are the primary unwanted byproducts generated in the production of crude oil. All petroleum products contain some sediments and water with different ratios of oil, water and solids in various states of emulsification. In all cases, excessive levels of sediment and water yield a product that is unsellable, non-usable and non-disposable.

In order to utilize this otherwise dormant oil/water emulsion, the level of sediments and water must be reduced to acceptable levels. Conventional prior art processes require some form of chemical treatment to break the emulsion, followed by gravity separation. These processes are generally so expensive that the petroleum product released from the emulsion is often worth less than the cost of treating the emulsion.

The present invention is directed to a novel centrifuge apparatus and method especially adapted for mechanically separating contaminants such as sediment and water from petroleum products. It has particular application in oil field production operations where large volumes of contaminated crude oil can be treated to produce a marketable petroleum product. The apparatus and method of the invention also has application in the refinement and disposal of various oil/water emulsions such as waste oil from manufacturing or transportation operations, heavy grade coring oils, various blends of slop oil and water flood oil skim.

The apparatus of the invention includes a three-stage decanting centrifuge that is especially adapted to separating water and solid contaminants from oil. In the past, three stage centrifuges have been utilized to process different oil based emulsions. In the production of olive oil for example, three stage centrifuges are utilized to separate oil, water, and solid components of the processed olives. Such decanting centrifuges are well known in the art.

In general, however, these types of prior art three stage centrifuges are not suitable for processing heavy emulsions such as those occurring in crude oil production. Additionally, these prior art centrifuges are not suited to the environmental conditions (i.e. temperature climate) that may be encountered in oil field operations, nor the wide range of physical characteristics (i.e. viscosity, water content, solids levels, solids type) of different emulsions to be processed. For these reasons such contaminated oil has been mostly processed by chemical treatment and settling of the contaminants.

Moreover, there is a need for a method of separating contaminants from petroleum products so that these contaminants can be disposed of in an environmentally safe manner. Waste oil from oil spills, manufacturing operations, service stations, and oil refineries for instance, are very difficult to dispose of in an environmentally safe manner.

The present invention is directed to a three stage centrifuge adapted to overcome the limitations of prior art centrifuges and to provide a method suitable for removing contaminants from petroleum products so that the petroleum product may be used and the contaminants may be safely disposed.

SUMMARY OF THE INVENTION

In accordance with the present invention a three stage centrifuge apparatus and a novel method for separating water and solids from petroleum products is provided.

The three stage centrifuge includes a horizontally mounted rotatable bowl that spins the emulsion to separate the fluid oil and water into separate pools within the bowl and to throw the solid particles outward by gravity. A conveyor auger then contacts the solid particles and discharges these contaminants from the rotatable bowl as water wet solids. A water discharge means includes an adjustable weir located at one end of the rotatable bowl at a position within the rotatable bowl to draw the separated water into a water discharge conduit. An oil discharge means includes adjustable oil discharge tubes that are also located at a position within the rotatable bowl to draw the separated oil out of the rotatable bowl into an oil discharge conduit. Oil baffles mounted within the rotatable bowl maintain an oil pool and prevent the disruption of the water and oil fluid levels by incoming emulsion. Sensing and control means control the operation of the conveyor auger in response to the amount of solids in the emulsion.

In general the method of the invention, for separating water and solids form a petroleum product includes the steps of: agitating an emulsion; heating the emulsion to a selected temperature; pumping the emulsion at a selected flow rate to a rotatable bowl; centrifuging the emulsion in the rotatable bowl to separate the water, oil and solid particles of the emulsion so that different discharge means within the rotatable bowl can draw the separated liquids (oils and water) into separate discharge conduits; and conveying the solids out of the rotatable bowl as oil free and water wet solids.

The apparatus and method of the invention are adapted to process a wide range of contaminated products including lights oil, heavy oils, and chemically contaminated oils.

Other objects, advantages and capabilities of the present invention will become more apparent as the description proceeds.

DETAILED DESCRIPTION OF THE PREFERRED EMBODIMENT

As the term to an intimate used herein emulsion refers mixture of two incompletely miscible liquids such as oil and water in which one of the liquids is in the form of fine droplets dispersed in the other. In an illustrative embodiment, the emulsion is a petroleum product such as crude oil contaminated with sediment and water. Alternately, other emulsions such as used motor oils, emulsions of sulfur acid and oil, and spilled oils are also subject to process by the method and apparatus of the invention. In general, the process removes the water and solid contaminants from the petroleum product so that the product may be used and the contaminants disposed.

Figure 1:
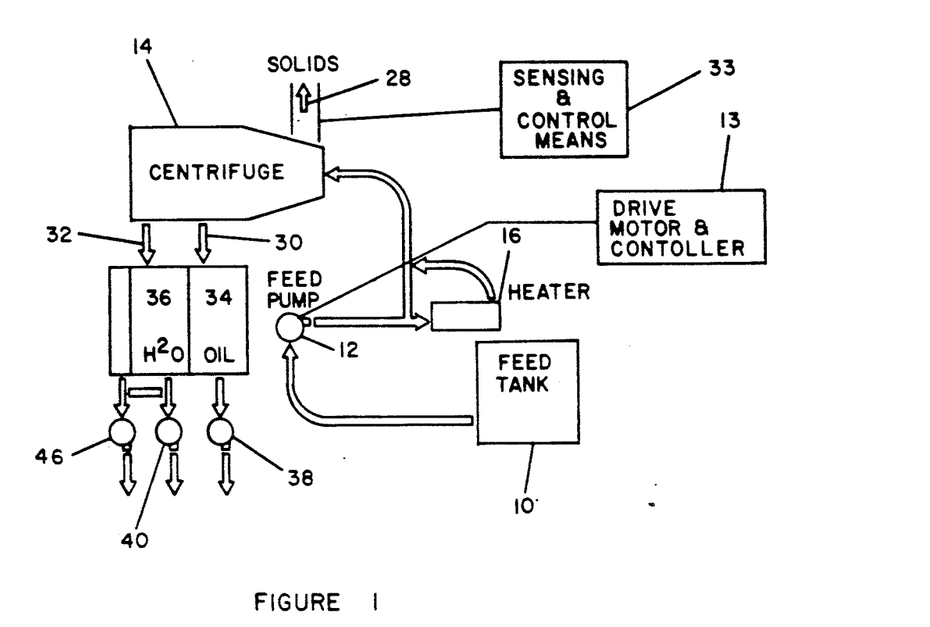
FIG. 1 is a schematic diagram showing a method of separating water, solids and oil from an emulsion in accordance with the invention.

Referring now to FIG. 1 a method of processing a contaminated petroleum product or emulsion in accordance with the invention is shown. As a first step an emulsion such as crude oil having solid particles, water, and oil in an emulsified mixture is collected in a receptacle such as a feed tank 10. Prior to processing the emulsion the product may be analyzed to determine its content. As an example, a sample may be analyzed to ascertain the percentages of solids, water, and oil in the emulsion. The temperature of the product as well as its chemical composition may also be determined. This information may then be utilized to select the process parameters for processing the emulsion in accordance with the method of the invention.

In an illustrative embodiment of the invention the feed tank 10 is a sealed vessel. Alternately this receptacle need not be a sealed tank 10 but may be an open pit or pool that may be emptied of or continuously replenished with the emulsion to be processed.

With most contaminated petroleum products it may be necessary to stir or otherwise agitate the emulsion to provide a homogeneous mixture. This may be done by mechanical stirring or by bubbling compressed air through the emulsion. It may also be desirable to remove large solid objects such as rocks, rags, and vegetation from the petroleum product.

Agitation may be necessary for example to mix oil and water in the emulsion to provide a constant oil-water ratio to feed into the centrifuge 14. Also, an emulsion may contain solids entrained in the oil and mixing will evenly disperse these solids through the emulsion.

From the feed tank 10 the emulsion is pumped through suitable conduits by a feed pump 12 into a centrifuge 14 constructed in accordance with the invention. The feed pump 12 may be selected to maintain a desired flow rate for the emulsion.

Additionally, the feed pump 12 may be selected to pump the emulsion with a minimum of turbulence. The contaminated product may contain relatively large solid particles that are more efficiently removed from the emulsion if they remain unbroken. Breaking up a solid particle increases the total surface area of solids within the emulsion and promotes adherence of these smaller solids to the oil within the emulsion. It is therefore desirable to maintain relatively large solid particle sizes.

One suitable feed pump 12 for moving the emulsion from the feed tank 10 to the centrifuge 14 is a progressing cavity pump. These type of pumps may be utilized in low pressure applications for moving fluids in a laminar flow with a minimum of trauma to the fluid.

Suitable control means may be operably coupled to the feed pump 12 to achieve a selected output from the feed pump 12. Feed rates to the centrifuge 14 may vary depending on the type of emulsion being processed and on the rated capacity of the centrifuge 14. In an illustrative embodiment of the invention feed rates may be varied from about 15 gallons per minute (GPM) to a maximum of about 65 gallons per minute (GPM).

Figure 4:
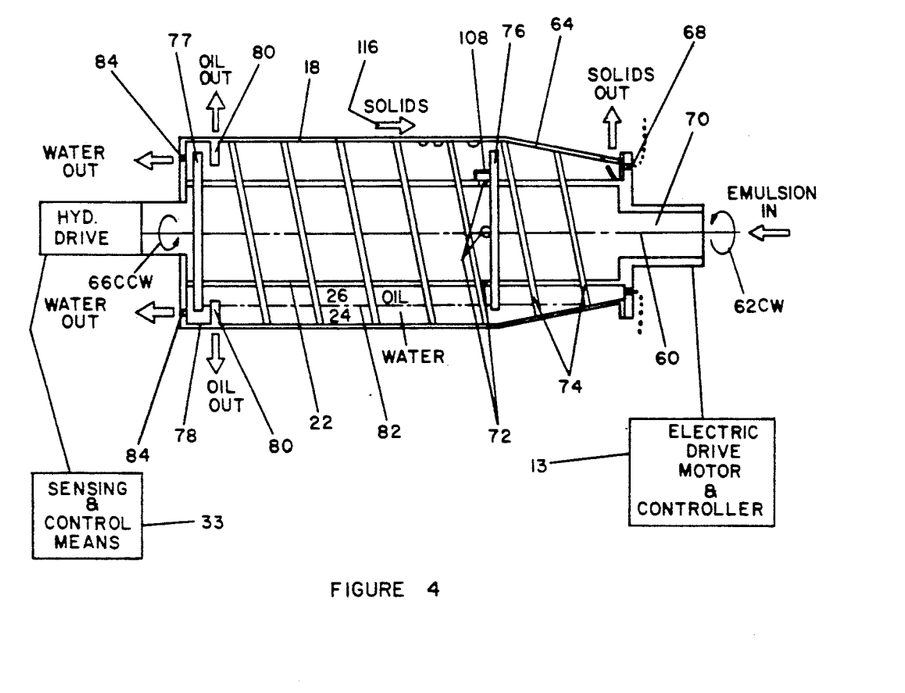
FIG. 4 is a schematic diagram of the centrifuge of the invention showing relative movement of its components and movement of oil, water, and solids through the centrifuge.

In addition to minimizing emulsification of the solid particles within the oil, a progressing cavity feed pump 12 may be controlled to maintain a smooth even flow of emulsion to the centrifuge 14. This is necessary to keep the centrifuge 14 running steady as surges or erratic flow tend to upset oil and water pools formed within the centrifuge 14. As an example, the feed pump 12 may be driven by an electric motor and controller 13 (FIG. 4). The speed of the electric motor may be controlled with a suitable motor controller so that the pump rate can be accurately controlled. This control can be used to fine tune the process and maintain steady operation of the centrifuge 14.

Prior to entry into the centrifuge 14, it may be necessary to heat the emulsion with an in-line heater 16. In general, an emulsion must be heated to increase the viscosity of the fluid so that it moves more easily through the centrifuge 14. Heating may also be required to change the characteristics of some emulsions in order to render the emulsion more susceptible to treatment. Parafin solvents may be used for example, in some oil field operations and it may be necessary to heat an emulsion containing parafin in order to maintain the parafin in liquid form.

In an illustrative embodiment of the invention the heater 16 is a continuous flow heater having electric submersible elements. A representative temperature range of the emulsion may be from about 125° F. to about 200° F. In general electric heaters are safer in this operation than gas heaters due to the possibility of flammable gases being present.

Some emulsion may not require heating if the emulsion is already at a suitable processing temperature. It may be detrimental to heat other types of emulsion such as for example crude oil or acid contaminated with sulfur. Moreover, heating should not be performed to a temperature that burns the light ends of the oil because this may form gases within the centrifuge 14.

In general more heat is required for oils having a large percentage of solids and for heavy oils. Less heat is required for light oils as well as oils having fine solids and sulfuric solids.

After heating, the emulsion is moved by the feed pump 12 into the centrifuge 14. As shown schematically in FIG. 2 and 2A the centrifuge 14 includes a horizontally mounted rotatable bowl 18 that spins about its longitudinal axis at relatively high rpm's (example approximately 1780 rpm). This rotation subjects the solid particles 20 within the emulsion to high g-forces (example 700-1000 g's) and moves these solid particles 20 radially outward towards the inside wall of the rotatable bowl 18 where they are conveyed away by a conveyor auger 22 (FIG. 4).

Figures 2, 2A:
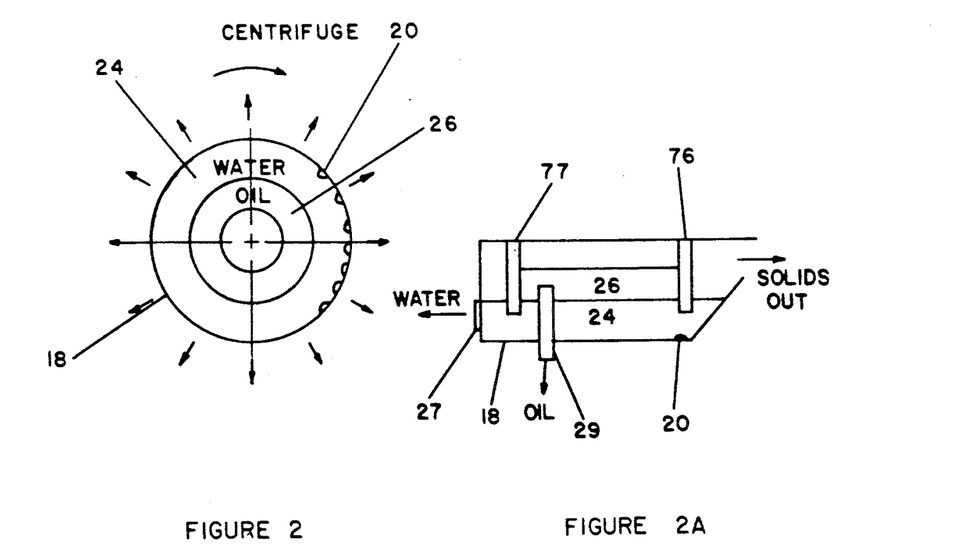
FIGS. 2 and 2A are schematic views of the centrifuge of the invention showing the separation of an emulsion into oil, water, and solid components by centrifugal force.

Additionally, as shown schematically in FIG. 2 and FIG. 2A, rotation of the rotatable bowl 18 creates separate pools of water 24 and oil 26 at different pool depths within the rotatable bowl 18. The oil pool 26 is retained between baffle plates 76, 77. These separate fluid levels of water 24 and oil 26 occur because water and oil do not mix and the fluids of different specific gravities are separated by centrifugal forces exerted by the rotatable bowl 18. The point of separation between the oil and water is clearly delineated and in effect seals the two fluids from mixing.

As will hereinafter be more fully explained, separate discharge means, water discharge means 27 and oil discharge means 29 within the rotatable bowl 18, remove the water and oil from the centrifuge 14 at different pool depths within the centrifuge 14. Moreover, as previously stated, the conveyor auger 22 (FIG. 4) conveys the solids out of the centrifuge 14. A sensing and control means 33 regulates the speed of the conveyor auger 22 and the output of solids in response to the amount of solids in the emulsion.

With reference to FIG. 1, discharge of the solids from the centrifuge 14 is represented by arrow 28, discharge of oil is represented by arrow 30 and discharge of water represented by arrow 32.

Figure 3:
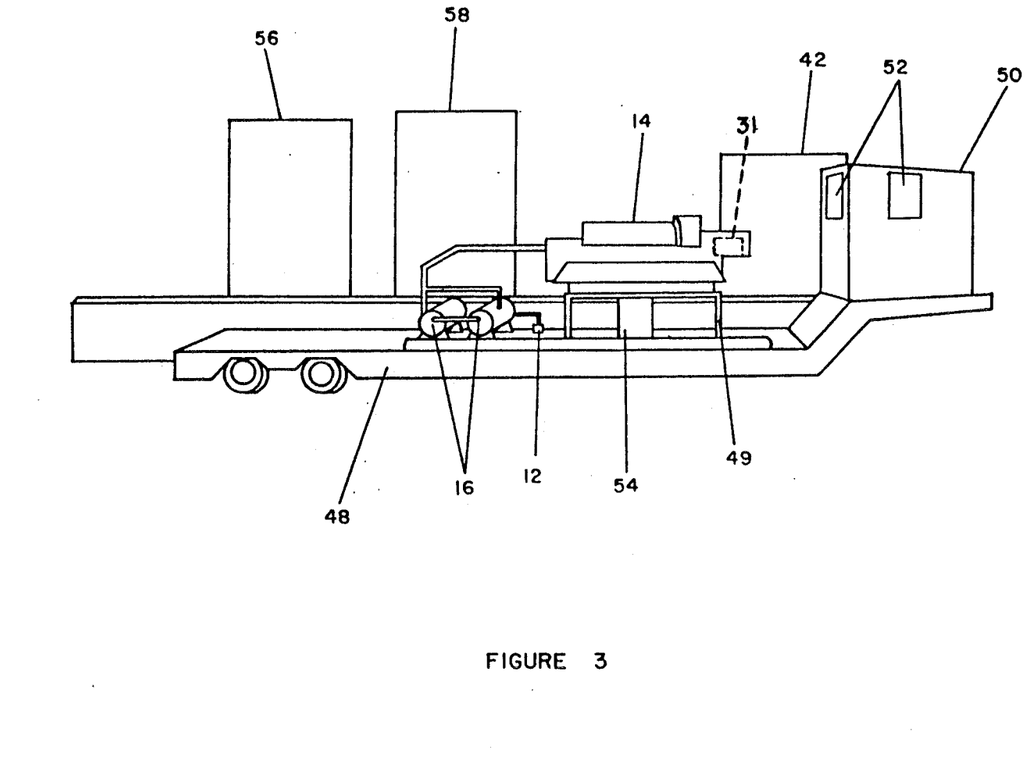
FIG. 3 is a perspective view of an apparatus constructed in accordance with the invention for carrying out the method of the invention.

The liquid oil and water discharged from the centrifuge 14 may be gathered in suitable receivers (oil receiver 34, water receiver 36). The oil may then be pumped through suitable conduits by an oil pump 38 to a storage vessel 56, 58 (FIG. 3). The water may be pumped away by a water pump 40. Additionally, as shown schematically in FIG. 1, some water may be pumped through conduits by a makeup pump 46 back into the centrifuge 14. This make-up water may be required in the processing of some emulsions in order to facilitate separation of the solids and oil within the emulsion.

Referring now to FIG. 3, the apparatus of the invention is shown in an illustrative embodiment. As shown the apparatus includes the centrifuge 14, feed pump 12, and heater 16, all mounted on a movable trailer bed 48. The trailer bed 48 may be transported by a truck in order to move and perform the method of the invention at different job sites. The centrifuge is mounted on a frame 49 or a stand located on the trailer bed 48.

An operator enclosure 50 is mounted at an elevated end of the trailer bed 48. The operator enclosure 50 contains various control means which enable an operator to control different parameters of the process (i.e. feed rate, temperature, discharge, continuity). The operator enclosure 50 provides an operator protection from the elements and may include one or more viewing windows 52.

An emulsion to be processed such as crude oil contaminated with sediment and water is contained in an oil storage tank 42. As previously explained, the emulsion may be agitated or stirred within the storage tank 42 as required. The feed pump 12 receives the emulsion though suitable conduits (not shown) from the storage tank 42 and moves the emulsion through the heaters 16 (as required) and into the centrifuge 14. A solids discharge chute 54 receives the processed water wet solids from the centrifuge 14. Storage tanks 56, 58 receive through suitable conduits (not shown) the processed oil from the centrifuge 14.

Referring now to FIG. 4 a schematic of the centrifuge 14 is shown. The centrifuge 14 includes the rotatable bowl 18 and the conveyor auger 22. Emulsion is pumped by the feed pump 12 through the center of the conveyor auger 22 and into the rotatable bowl 18. Rotation of the rotatable bowl 18 separates the emulsion into the oil, water and solids. The solids are pushed as indicated by arrow 116 by the conveyor auger 22 to a solids discharge port 68. The oil and water separated by centrifugal forces along a line of separation 82 are discharged at a fluid discharge end 78 of the rotatable bowl 18. Oil is discharged from oil discharge tubes 80 located at a pool depth to contact only oil. Water is discharged from water weirs 84 located at a pool depth to contact only water.

In an illustrative embodiment of the invention the rotatable bowl 18 rotates about a longitudinal axis 60 in a clock wise direction as indicated by arrow 62. Suitable drive means such as an electric drive motor (not shown) may be drivably coupled to the rotatable bowl 18 to power the rotation. As an example the rotatable bowl 18 may be rotated at about 1780 rpm.

The rotatable bowl 18 is hollow and generally cylindrical in shape but is formed with a tapered beach 64 of reduced cross section at one end. As will hereinafter be more fully explained, the tapered beach 64 provides an annulus of reduced cross section which during operation of the centrifuge fills partially with water.

The beach 64 of the rotatable bowl 18 may be lined with a smooth non-porous material such as ceramic tiles. This smooth surface provides reduced friction for solids that are pushed by the conveyor auger 22 through the beach 64 and out the solids discharge port 68. Also, caked solids formed after a period of "shut down" are more easily separated from the beach 64 formed with a smooth surface.

The centrifuge 14 also includes the conveyor auger 22 that is concentrically mounted within the rotatable bowl 18 and is also journaled for rotation. In an illustrative embodiment of the invention, this direction of rotation of the conveyor auger 22 is opposite to the direction of rotation of the rotatable bowl 18 and is counterclockwise as indicated by arrow 66. Alternately, both the rotatable bowl 18 and the conveyor auger 22 may rotate in the same direction.

The conveyor auger 22 may be driven by a suitable drive means such as a hydraulic drive motor 31 (FIG. 3). The rotational speed of the hydraulic drive motor 31 may be closely controlled by suitable sensing and control means 33 (FIG. 1) responsive to the amount of solids being conveyed to the discharge port 68. A sensing and control means 33 may be utilized for instance that senses a hydraulic drive pressure on the hydraulic drive motor 31. This pressure may then be related to the torque on the conveyor auger 22 exerted by the solids being conveyed. With the sensing and control means 33 an increase in pressure and in the torque caused by an increased amount of solid particles within the rotatable bowl 18 can be sensed and the conveyor auger 22 speed may be increased to handle the increased load. Jams and slugs of solid material can thus be cleared in this way to insure a constant flow of solids through the rotatable bowl 18 and discharge of solid material through the discharge port 68.

The conveyor auger 22 is generally cylindrical in shape and is hollow in the middle. The conveyor auger 22 includes an inlet port 70 for the contaminated emulsion and a plurality of emulsion inlets 72 that discharge the emulsion into the rotatable bowl 18. In an illustrative embodiment of the invention the emulsion is discharged into the rotatable bowl 18 with a flow direction towards the fluids discharge end 78 of the rotatable bowl. Thus is termed a co-current inlet flow. Alternately, the centrifuge may be configured with a counter current inlet flow.

The conveyor auger 22 is formed with helically wound flights 74 on its outer periphery. These helical flights 74 move the solids that are pushed by centrifugal force against the inside of the rotatable bowl 18 through the rotatable bowl 18 and to the solids discharge port 68.

As previously stated, in an illustrative embodiment of the invention the conveyor auger 22 turns in an opposite direction (CCW) than the rotatable bowl 18 (CW). Alternately the conveyor auger 22 may be configured however, to turn in the same direction as the rotatable bowl 18, as long as it has flights 74 shaped to move solids material to the discharge port 68.

As an example, the conveyor auger 22 may turn at from one to twelve revolutions per minute with respect to the rotatable bowl 18. If the rotatable bowl 18 is turning for example at 1780 rpm the conveyor auger 22 must turn at this rate plus one to twelve rpm's more. This rate is termed herein as the conveyor augur ratio and in general is a number between one and twelve.

Two oil baffle plates 76, 77 are mounted on the conveyor auger 22 to maintain a pool of oil therebetween. A first oil baffle plate 76 is located adjacent to the emulsion inlets 72 to the rotatable bowl 18. A second oil baffle plate 77 is located adjacent the fluids discharge end 78 of the rotatable bowl 18. During operation of the centrifuge 14 the baffle plates 76, 77 function to maintain a pool of oil within the rotatable bowl 18 between the baffle plates 76, 77 so that the oil may be discharged through oil discharge tube 80 mounted to the rotatable bowl 18.

Figure 5:
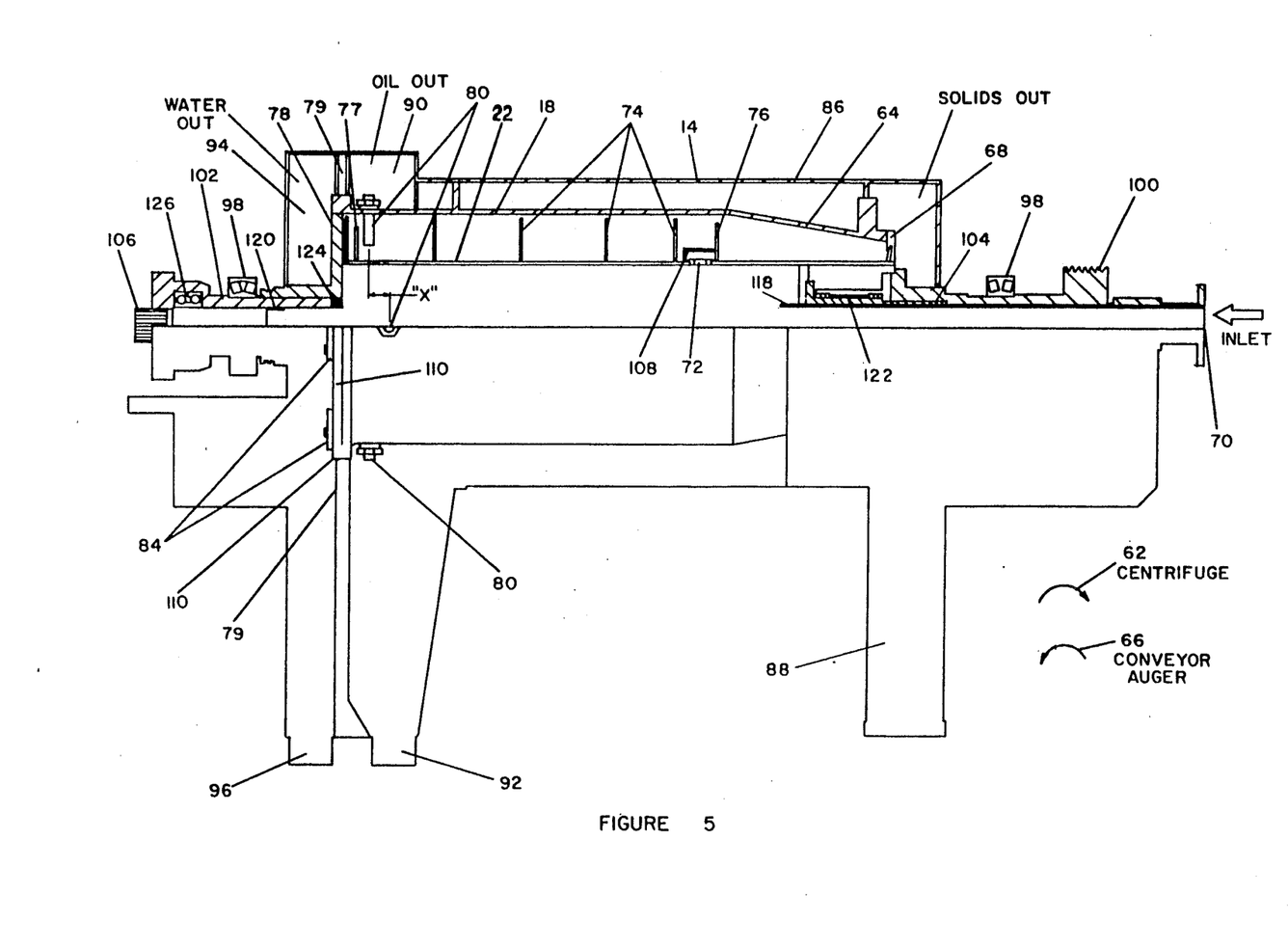
FIG. 5 is a cross section taken through a centrifuge constructed in accordance with the invention.

Referring now to FIG. 5 the centrifuge 14 is shown in more detail in an actual cross section. As previously stated the centrifuge 14 includes the rotatable bowl 18 and the conveyor auger 22. Additionally the entire assembly is enclosed by a stationary enclosure 86.

The stationary enclosure 86 includes a solids discharge pan 88 that receives solids discharged from the solids discharge port 68. The stationary enclosure 86 also includes an oil discharge section 90 for receiving oil thrown out of the oil discharge tubes 80. The oil discharge section 90 of the stationary enclosure 86 terminates in a threaded coupling 92 that may be coupled to suitable conduits for pumping the processed oil into the storage tanks 56, 58 (FIG. 3).

The stationary enclosure 86 also includes a water discharge section 94 for receiving water discharged from the water weirs 84. The water discharge section 94 terminates in a threaded coupling 96. This coupling 96 may be coupled to suitable conduits for pumping the water away or back into the centrifuge 14 to aid in processing some emulsions. An air space 79 is formed between the water discharge section 94 and oil discharge section 90.

The rotatable bowl 18 is journaled for rotation on heavy bearings 98 which will be mounted on pillow blocks (not shown) on a stationary framework. A drive sheave 100 is drivably coupled to an electric drive motor for turning the rotatable bowl 18. A thrust bearing 126 is mounted on an opposite end from the drive sheave 100.

The hollow cylindrical conveyor auger 22 is mounted on a stationary hollow trunion 118 and is journaled on sleeve bearings 102, 104 for rotation within the rotatable bowl 18. Suitable seal elements 120, 122 seal the conveyor auger 22 from the rotatable bowl 18 and stationary enclosure 86. Other seal elements 124 seal the rotatable bowl 18 at the fluid's discharge end 78. The conveyor auger 22 is coupled to a splined shaft 106 that drivably couples to a hydraulic drive.

The oil baffle plates 76, 77 are attached to the conveyor auger 22. The oil baffle plates 76, 77 are flat and generally circular in shape and are welded directly to the conveyor auger 22. These baffle plates 76, 77 are sized to confine the oil pool formed in the rotatable bowl 18 to retain oil between the emulsion inlets 72 and the oil discharge tubes 80. This permits the oil discharge tubes 80 to draw only oil.

Water is also formed as a continuous pool 24 (see FIG. 2A) and extends into the beach area 64. In addition to being located adjacent to the oil pool 26, the water pool 24 is located on an opposite side from the oil pool 26 at the front baffle plate 76. Additionally, at the fluids discharge end 78 of the rotatable bowl 18, the water pool 24 extends on the opposite side of baffle 77 from the oil pool 26. Additional baffle plates 108 may be welded over each of the four emulsion inlets 72 that are formed on the conveyor auger 22. These baffle plates 108 function to keep emulsion directed from the emulsion inlets 22 into the rotatable bowl 18 from disrupting the separate fluid pools (oil 26 and water 24 [FIG. 2A]) formed within the rotatable bowl 18. It is critical throughout the construction and operation of the centrifuge 14 to provide for a smooth laminar flow of fluids through the centrifuge 14.

The flights 74 of the conveyor auger 22 are welded directly to the generally cylindrical exterior of the conveyor auger 22. The flights 74 are machined to an outside diameter that is just slightly less than the inside diameter of the rotatable bowl 18. This arrangement permits fine or water caked solid particles to be pushed by the edge of the flights 74 to the solids discharge port 68. As is apparent the flights 74 tend to push the solids mostly through the water pool 24 located along the inner wall of the rotatable bowl 18 and the water pool 24 formed in the beach area 64. This movement of solids through water helps to scrub the solid particles free of oil so that the discharged particles are water wet and not encapsulated with oil. As an example, in order to meet some environmental regulatory specifications, these discharge solids must contain less than about 10,000 PPM of oil.

The oil discharge tubes 80 are mounted directly to the rotatable bowl 18. In an illustrative embodiment there are four oil discharge tubes 80, a set of two front tubes and a set of two back tubes. The front tubes are located farther into the interior of the rotatable bowl than the two back tubes which are located adjacent to the oil baffle plate 77. This axial offset is indicated by distance "x" in FIG. 5. These two sets of axially offset oil discharge tubes 80 each function to draw oil from the oil pool 26 but at different axial points along the longitudinal axis 60 of the rotatable bowl 18. (As shown in FIG. 2A the oil pool 26 is formed in a continuous pool 26 located between the baffle plate 76, 77). The front oil discharge tubes tend to draw oil out in a pool area in front of the oil baffle plate 77 whereas the back tubes tend to draw oil out at a pool area adjacent to the baffle plate 77. Because these two sets of oil discharge tubes 80 are located at different axial points in the oil pool 26 (FIG. 2A), the efficiency of oil discharge is improved and the discharge of water with the oil is decreased or eliminated.

Each oil discharge tube 80 is mounted on a threaded stud. This permits the tubes 80 to be located at an optimum depth within the oil pool 26 for drawing only oil from the pool.

Figure 6:
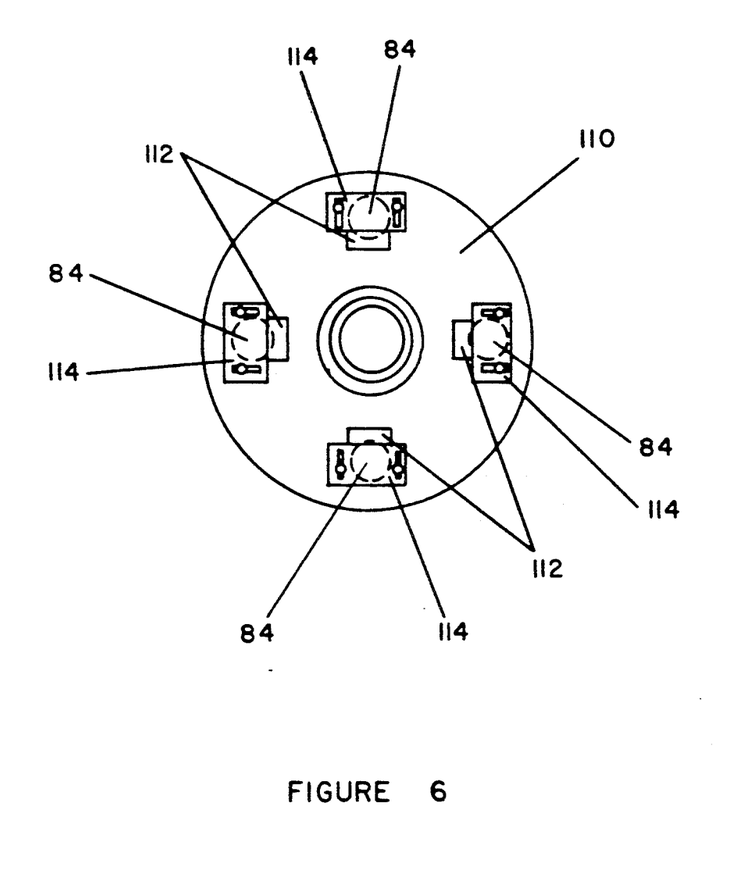
FIG. 6 is an end view of FIG. 5 showing construction and location of water weirs for the centrifuge.

The water weirs 84 for discharging water from the centrifuge are located on a end plate 110 attached to the end of the rotatable bowl 18. As shown in FIG. 6 the end plate 110 has four generally rectangular shaped openings 112 formed therethrough. Slotted plates 114 partially cover the openings 112. The location of these slotted plates 114 may be adjusted as required at a pool depth for withdrawing only water from the rotatable bowl 18.

EXAMPLE 1

An Emulsion of Oil/Water/Light Solids

Before processing any emulsion, a sample of the emulsion is first subjected to a laboratory centrifuge or "grind out" to ascertain its characteristics, including solids content, oil percentage, water percentage and chemical composition if necessary. This helps to determine the process parameters to be used in processing the emulsion. Additionally the "grind out" rpm's and diameter of the lab centrifuge can be utilized to determine "g" forces in the processing of the emulsion. In general emulsions having a solids content of less than 30% are considered light solids.

Weir Setting

A light solids fluid requires a relatively deep water pool to insure constant and smooth flow of water through the centrifuge 14. This is done by moving the water weirs plates 114 towards the center of the centrifuge.

Oil Tubes

With light oil, the oil tubes 80 must be set radially inward to keep a deep pool of oil between the baffles plates 76, 77. This gives more retention time in the centrifuge 14 and produces a better or optimal separation of oil, solids and water. This is necessary with light oil because in general light oils have relatively fine solids entrained in the oil. Accordingly, more retention time within the centrifuge is required to separate these fine particles from the emulsion. The initial setting of the oil tubes 80 may have to be changed after start up. This setting will depend on the percentage of oil in the emulsion and the feed rate to the centrifuge 14.

Conveyor Auger

In all oils the conveyor ratio should be run as low a possible to keep agitation in the centrifuge 14 to a minimum. A good starting ratio is 2–3. This may have to be increased if solids are not conveying out of centrifuge 14 fast enough. This may cause the centrifuge 14 to load up with solids and carry over solids into the fluid discharge.

Feeding Fluids

With oil and water it is easy to ascertain an optimal pool setting. As soon as oil and water pools form at the predetermined depths and fluid discharge occurs there should be an instant oil water split. It will take some period of operation (ex. 15 minutes) for the centrifuge to level out at this rate. The feed rate into the centrifuge can then be set to achieve maximum volume and an optimum separation of fluid and solids. Every oil has its own characteristic and can only be processed relative to its physical characteristics and solids content. Feed rates vary from, as an example, 15 GPM to a maximum of 60–65 GPM.

Agitation

Agitation for oils is necessary to mix oil and water and to achieve a constant oil water ratio feed to the centrifuge 14. Lighter oils may not need as much agitation as sulfur containing or heavier oils because finer solids tend to stay tied up in the fluid. This is called an inner phase. These solids are emulsified or oil coated and are entrained in the fluids. Caution should be taken to not use to much agitation or emulsification can become tighter. This requires more retention time to make a clean split of the liquids and solids. If there is little or no water in the feed tank 42 it should only be mixed long enough to stir the solids off of the bottom of tank and keep the fluids moving smoothly through inlet hoses.

Temperature

In general light oils may be processed at the same temperature as used in the production of the oils. This temperature is usually a maximum that the oil can take before the light end of the oil is cooked or burned. If cooking occurs, gases will be produced in the centrifuge. This will upset the pool depths in the centrifuge 14 and may cause unacceptable oil and water discharges. If this occurs, the heaters 16 should be shut down until the fluid cools to its operating temperature. If any changes need to be made, the centrifuge must be given time to smooth out. Some lighter oil may take more heat to help keep optimal splits. More heat may be required with light oils because light oils have a tendency to be burnt with chemicals. More heat will help break bond of the oil with the chemically burnt oil.

Injection and Chemicals

On some light oils there are usually finer solids which in turn have tighter emulations. This is when injection and chemicals are needed. In most cases the best additive to use is water. If the centrifuge is not making clean splits on solids and oil, the make-up water can be injected into the centrifuge to help wash the oil off the solids. This is also helpful when the centrifuge 14 will not smooth out or maintain steady oil water splits due to the lack of water in the emulsion. Make-up water may also be necessary when pumping near the bottom of the feed tank 42 if there is very little water left in tank. Some oils have chemical additives and may have been over treated or burned. In some cases a chemical such as a solids dispersant can be utilized. The right chemical and injection rate need to be determined for proper use.

Discharge Fluids

Most discharged water should be clear when viewed through a sample jar. In some cases though the water may carry a brownish tint. This can come from the color of some chemicals carrying through with the water. The centrifuge should be adjusted to make the water as clean as possible and free of solids. Oil discharge should be as clean as possible and should be checked by "grind out" to meet specifications. Specifications may vary depending on GPM through centrifuge and percentage of water and solids in the emulsion. One goal is to achieve a pipeline grade oil.

Thus, the invention provides a method and apparatus for processing contaminated liquids such as an emulsion, to separate oil, water, and solids from the emulsion. While the invention has been described with reference to preferred embodiments thereof, as will be apparent to those skilled in the art, certain changes and modification can be made without departing from the scope of the invention as defined by the following claims.

What is claimed is:

1. A three stage centrifuge for separating oil, water and solids from a petroleum product emulsion comprising:
   a generally cylindrical shaped rotatable bowl having a tapered beach section of a reduced cross section with the bowl rotatable to separate the emulsion into separate oil and water pools and to throw solids radially outward by centrifugal force;
   drive means for rotating the rotatable bowl;
   conveyor means within the rotatable bowl for conveying solids through the rotatable bowl to a solids discharge port adjacent to the tapered beach;
   means for pumping emulsion to an emulsion inlet and into the rotatable bowl with a minimum of turbulence and with substantially no breaking of solid particles;
   drive means for driving the conveyor means;
   a pair of baffle plates mounted within the rotatable bowl for forming an oil pool therebetween;
   oil discharge means including an adjustable oil discharge tube mounted between the baffle plates to draw oil from the oil pool and out of the rotatable bowl;
   water discharge means mounted within the rotatable bowl to contact the water pool and draw water out of the rotatable bowl;
   baffle means associated with the emulsion inlet for baffling flow of emulsion into the centrifuge to prevent disrupting of the oil and water pools; and
   sensing and control means for controlling the conveyor means responsive to a torque exerted by the solids in the emulsion.

2. The centrifuge as claimed in claim 1 and wherein: the oil discharge means comprises adjustable oil discharge tubes mounted to the rotatable bowl and axially offset from one another along a longitudinal axis of the rotatable bowl.

3. The centrifuge as claimed in claim 1 and further comprising:
   means for agitating the emulsion prior to inlet into the rotatable bowl.

4. The centrifuge as claimed in claim 1 and wherein: the pump means is a progressing cavity pump.

5. The centrifuge as claimed in claim 1 and wherein: the tapered beach of the rotatable bowl is lined with a ceramic material.

6. The centrifuge as claimed in claim 1 and wherein: the drive means for rotating the conveyor means is a hydraulic drive; and
   the sensing and control means senses pressure on the hydraulic drive and increases or decreases a speed of the drive means responsive to torque exerted by solids on the conveyor means.

7. The centrifuge as claimed in claim 1 and wherein: the conveyor means is an auger having helically wound flights for moving solids through the rotatable bowl to the solids discharge port.

8. The centrifuge as claimed in claim 1 and wherein: the rotatable bowl is surrounded with a stationary enclosure having a solids discharge section for receiving solids form the discharge port, an oil discharge section for receiving oil from the oil discharge means and a water discharge section for receiving water from the water discharge means.

9. A three stage centrifuge for separating oil, water and solids from a petroleum product emulsion comprising:
   a rotatable bowl for receiving and rotating the emulsion in order to exert centrifugal force on the emulsion to separate the emulsion into water and oil pools and to move the solids radially outward, with the rotatable bowl having a tapered beach section at one end with a solids discharge port;
   drive means for rotating the rotatable bowl;
   a generally cylindrical shaped conveyor auger rotatably mounted within the rotatable bowl and having an emulsion inlet and helically wound flights for contacting solids and for moving the solids through a water pool formed in the rotatable bowl to the discharge port;
   hydraulic drive means for rotating the conveyor auger;
   pressure sensing and control means for sensing and varying pressure to the hydraulic drive means with varying torque on the conveyor auger exerted by solids in the emulsion in order to control a speed of the conveyor auger;
   a feed pump for pumping emulsion to the emulsion inlet and into the rotatable bowl with a minimum of turbulence and substantially without breaking solid particles in the emulsion;
   a first baffle plate mounted to the conveyor auger adjacent to the emulsion inlet and a second baffle plate mounted to the conveyor auger adjacent to a fluid's discharge end of the rotatable bowl;
   a first oil discharge tube mounted to the rotatable bowl between the first and second baffle plates and a second oil discharge tube mounted to the rotatable bowl between the first and second baffle plates with the first and second oil discharge tubes axially offset and adjustable to contact an oil pool formed within the rotatable bowl for discharging the oil;
   an adjustable water weir mounted to an end of the rotatable bowl for contacting a water pool formed within the rotatable bowl and for discharging the water from the rotatable bowl; and
   a third baffle plate associated with the emulsion inlet for preventing disruption of the oil and water pools by incoming emulsion.

10. The three stage centrifuge as claimed in claim 9 and further comprising:
    heating means for heating the emulsion prior to pumping into the rotatable bowl.

11. The three stage centrifuge as claimed in claim 10 and wherein:
    the feed pump is a progressing cavity pump.

12. The three stage centrifuge as claimed in claim 11 and wherein:
    the beach is lined with a ceramic material.

13. The three stage centrifuge as claimed in claim 10 and wherein:

the conveyor auger turns relative to the rotatable bowl at a rate of from one to twelve revolutions per minute.

14. The three stage centrifuge a claimed in claim 13 and wherein:

the direction of rotation of the rotatable bowl and the conveyor auger are opposite to one another.

15. The three stage centrifuge as claimed in claim 14 and further comprising:

means for agitating the emulsion prior to entry into the rotatable bowl.

16. The three stage centrifuge as claimed in claim 15 and wherein:

there are two sets of axially offset oil discharge tubes.

17. A method of processing a petroleum fluid to remove water, and solids comprising:

agitating the fluid to provide a homogeneous mixture;

heating the fluid to a selected temperature;

pumping the fluid with a minimum of turbulence and substantially without breaking of solid particles in the fluid at a selected feed rate to a generally cylindrical rotatable bowl having a beach section of reduced cross section;

rotating the fluid within the rotatable bowl in order to separate the fluid into separate oil and water pools and to throw solids in the fluid outward by centrifugal force within the rotatable bowl;

conveying the solids within the rotatable bowl through a water pool formed in the beach area of the rotatable bowl to a solids discharge port;

dischargin oil from the rotatable bowl through an oil discharge means having an oil discharge tube within the rotatable bowl placed into the oil pool and located between oil baffle plates within the rotatable bowl;

discharging water from the rotatable bowl through a water discharge means placed into the water pool;

sensing and controlling a rate of conveying of the solids to the solids discharge port in response to the amount of solids; and baffling incoming fluid into the rotatable bowl to prevent disruption of the oil and water pools.

18. The method as recited in claim 17 and wherein:

pumping the fluid is by means of a progressing cavity pump.

19. The method as recited in claim 18 and further comprising:

injecting a chemical solids dispersant into the fluid.

* * * * *